Aug. 13, 1940.  K. BRENKERT  2,211,363
LUBRICATING SYSTEM FOR MOTION PICTURE PROJECTORS
Filed Oct. 1, 1938  2 Sheets-Sheet 1

INVENTOR.
KARL BRENKERT
BY *Samuel Wiseman*
ATTORNEY.

Aug. 13, 1940.    K. BRENKERT    2,211,363
LUBRICATING SYSTEM FOR MOTION PICTURE PROJECTORS
Filed Oct. 1, 1938    2 Sheets-Sheet 2

INVENTOR.
KARL BRENKERT
BY Samuel Weisman
ATTORNEY.

Patented Aug. 13, 1940

2,211,363

UNITED STATES PATENT OFFICE 2,211,363

LUBRICATING SYSTEM FOR MOTION PICTURE PROJECTORS

Karl Brenkert, Detroit, Mich., assignor to Brenkert Light Projection Company, Detroit, Mich., a corporation of Michigan Application October 1, 1938, Serial No. 232,813

6 Claims. (Cl. 184—6)

The present invention pertains to a novel lubricating system for motion picture projectors. The principal object of the invention is to provide a continuous system that is thoroughly reliable and effective as well as comparatively simple and inexpensive in construction. Although various lubricating systems are now in use, they are either unreliable or too complicated and expensive. These objections are overcome by means of the present invention.

Another object of the invention is to provide concentrated and intensified lubrication wherever required, while the remainder of the system is subjected to a general spray of lubricant.

These objects are accomplished by forcing the lubricant to a reservoir above the mechanism, permitting the lubricant to drip from the reservoir, and dispersing the dripping lubricant throughout the mechanism. At certain shafts and other parts requiring more lubrication, suitable collectors are provided to accumulate substantial quantities of the sprayed lubricant and deliver it to such parts.

The invention is fully disclosed by way of example by the following description and the accompanying drawings, in which Figure 1 is a vertical section through a projector, illustrating the gear trains and the means for lubricating them;

Reference to these views will now be made by use of like characters that are employed to designate corresponding parts throughout.

Figure 1:
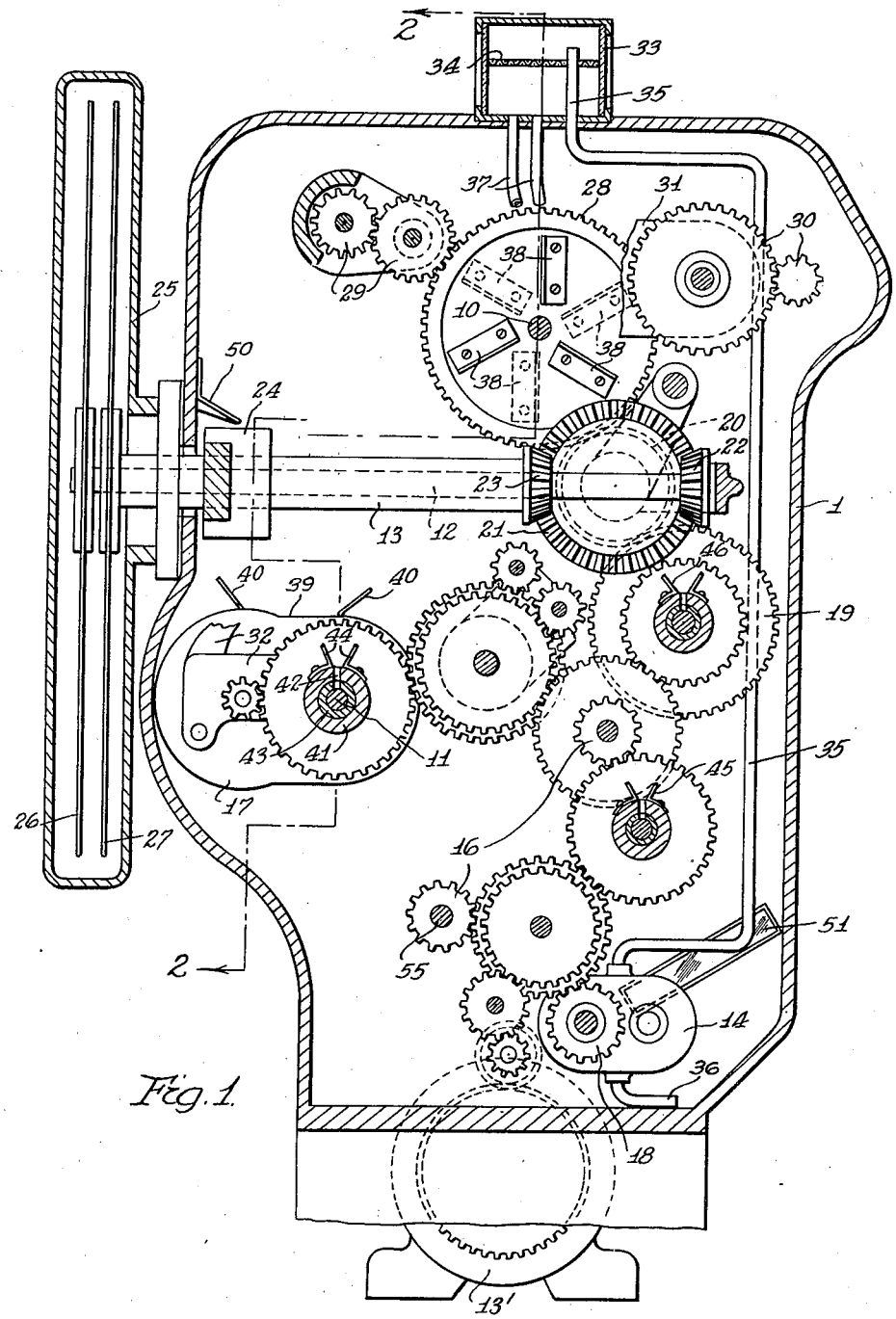
Figure 2:
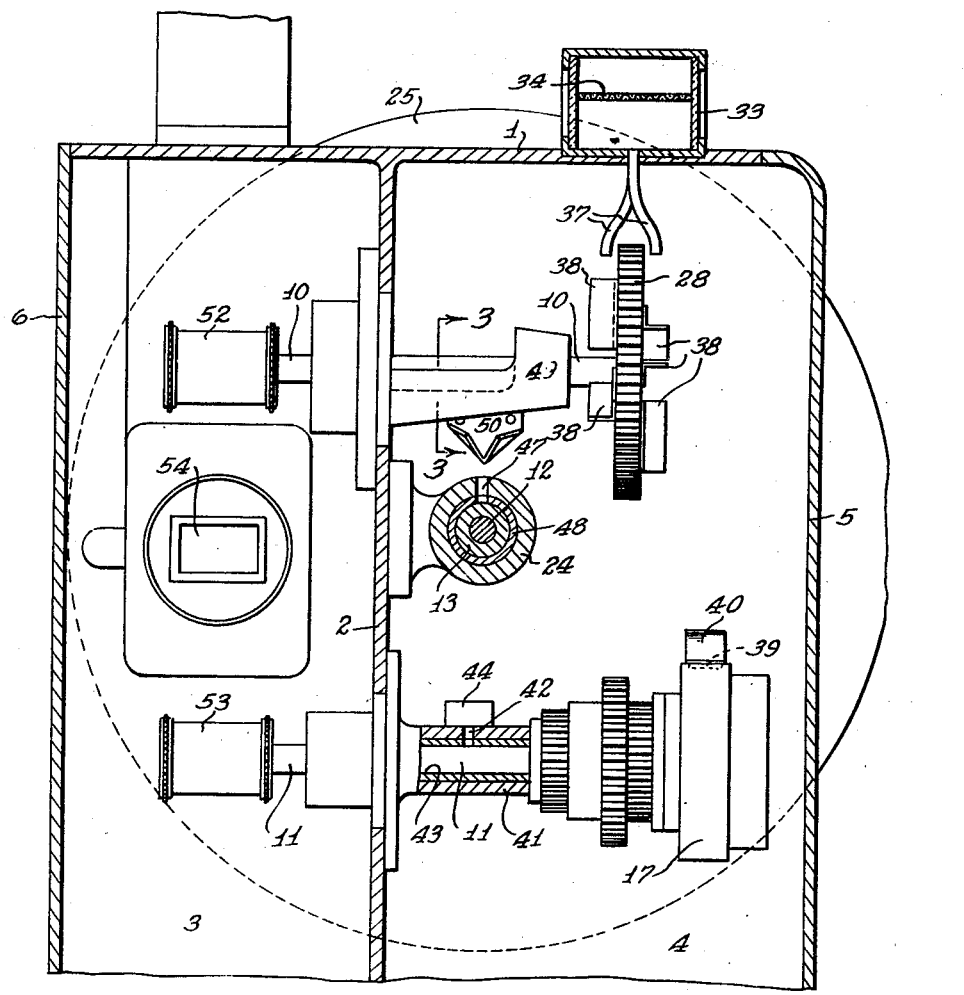
Figure 2 is a section on the line 2—2 of Figure 1.
Figure 4:
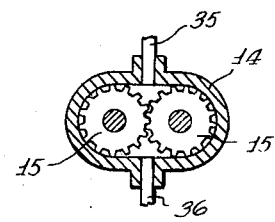
Figure 4 is a detail section of the gear pump.
Figure 3:
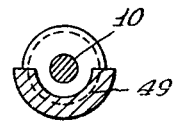
Figure 3 is a section on the line 3—3 of Figure 2.

In Figures 1 and 2 is illustrated the projector housing 1 in a vertical plane parallel to the shutter shaft. The interior of the housing is divided by a vertical partition 2 into a film compartment 3 and a mechanism compartment 4. The compartments are fluid tight with respect to each other since the lubricant in the mechanism compartment must not leak into the film compartment. The outer side wall 5 of the mechanism compartment is necessarily a separate member to permit assembly of the mechanism and is subsequently hermetically sealed to the body of the housing. The outer side wall 6 of the film compartment is in the form of a door to permit access to the interior of the compartment.

The operating mechanism in the compartment 4 may be regarded as conventional, so far as this invention is concerned, except as modified for the purpose of lubrication.

The mechanism compartment 4 contains three principal shafts, the remaining shafts being provided merely for the purpose of carrying the connecting gears or for the operation of accessory devices. The principal shafts are the upper sprocket shaft 10, the lower sprocket or intermittent shaft 11, both of which are perpendicular to and extend through the partition 2, and the shutter shafts 12, 13 perpendicular to the first named shafts and extending through the housing as illustrated in Figure 1.

At the base of the housing is a drive motor 13'. In the bottom of the housing is a gear pump comprising a casing 14 and a pair of meshing gears 15 therein in the usual manner.

A train of gearing 16 is provided between the motor 13' and the intermittent mechanism built around shaft 11. This gearing, as well as other gearing presently to be described, is designed for transmission of power and proper speed reduction. The intermittent mechanism operating on the shaft 11 is enclosed in a casing 17. The train 16 also connects with a driving gear 18 on the outside of the pump casing 14 and co-axial with one of the gears therein.

The train 16 is extended at 19 to mesh with spur teeth 20 on one side of a shutter actuating gear, the other side of which has bevel teeth 21. The shaft 12 lies within the shaft 13, both being properly journaled and the carrying bevel pinions 22 and 23 respectively meshing with the bevel gear 20 at diametrically opposite points.

The shafts extend through a bearing 24 and into a shutter housing 25 exterior of the main housing 1. Within the housing 25, the shafts 12 and 13 carry shutter blades 26 and 27 that rotate in opposite directions across a shutter opening (not shown).

The gear teeth 20 mesh with a gear 28 on the upper sprocket shaft 10, whereby the latter is actuated. The gear 28 drives a mechanism 29 for operating the usual governor and fire shutter as well as a ventilating fan (not shown). Adjacent to the gear 28 is a framing mechanism 30 also comprising gears which, however, are not in mesh with the gear 28. This mechanism also comprises the bar 31 linked in the usual manner to parts 32 associated with the intermittent mechanism for adjusting the latter with reference to the timing of the shutter in the usual manner, known in the art as framing.

On the top of the housing 1, preferably directly over the gear 28, is an oil reservoir including preferably a transparent side wall 33 with a horizontal dividing screen 34 therein. An oil supply pipe 35 extends from the outlet side of the pump to the space above the screen 34, preferably through the bottom of the reservoir for compactness. The pump intake pipe 36 extends to the floor or base of the housing 1, as illustrated in Figure 1.

From the bottom of the reservoir, drip pipes 37 extend downwardly to opposite sides of the gear 28. Both sides of the gear carry substantially radial blades or paddles 38 which are preferably staggered from one side to the other as may be seen in Figures 1 and 2. The oil dripping from the pipes 37 is picked up and struck by the rapidly revolving blades 38 and thereby sprayed over the entire mechanism within the mechanism compartment 4. The oil that drains off the mechanism collects in the bottom of the housing 1, and is picked up through the pump inlet 36 to be recirculated. Any solid matter collected by the lubricant is filtered out by the screen 34.

It is desired that the intermittent mechanism within the casing 17 operate in a bath of oil. Therefore, the top of the casing is formed with an opening 39 and diverging plates 40 at the ends of the opening. The plates collect the spray over a substantial area and deliver it into the casing 17.

The shaft 11 also requires special lubrication. To meet this requirement, the fixed bearing 41 of the shaft is formed with a port 42 registering with a similarly ported bushing 43 between the shaft and the bearing. Diverging plates 44 are secured to the bearing 41 at opposite sides of the port 42 to collect a quantity of lubricant and direct it into the bearing. Similar devices may be provided wherever desired throughout the gearing as indicated by the numerals 45 and 46 in Figure 1.

To lubricate the shafts 12 and 13 in their bearing 24, the latter has a port 47 registering with a similarly ported bushing 48 within the bearing. Above the bearing, a combination trough and bearing 49 is provided for the shaft 10. A spout 50 is carried by the housing in communication with the trough and is so positioned as to direct lubricant from the trough into the port 47.

In one of the walls of the housing 1 is a window 51 near the pump 14 for observing the oil level. The window is on a slope but takes a substantially horizontal position when the housing is tilted forward in operation.

The shafts 10 and 11 are extended through the partition 2 into the compartment 3 and are there provided with the usual film feed sprockets 52 and 53 respectively. Between the sprockets is the usual gate 54. The third sprocket is not shown, but its shaft is indicated by the numeral 55 in Figure 1 within the gear train 16.

It will now be evident that the invention provides a lubricating system of the character described that is comparatively simple in manufacture and thoroughly effective in operation. The construction herein described does away with individual piping to the parts to be lubricated and likewise eliminates possible clogging of such piping with the resulting serious damage to the machine from this cause. The lubrication of the mechanism by rapidly striking the dripping oil with rotating blades, as herein described, is equally thorough and effective regardless of the angle to which the projector is tilted in use.

Although a specific embodiment of the invention has been illustrated and described, it will be understood that various alterations in the details of construction may be made without departing from the scope of the invention, as indicated by the appended claims.

What I claim is:

1. In a motion picture machine, a housing, a plurality of parts therein to be lubricated, a rotary member mounted in said housing, radially disposed blades carried by said member and extending laterally therefrom and means for dropping oil into the path of said blades above the rotary axis of said member, the inner ends of said blades being spaced from said rotary axis, the spaces thus formed being at least partially unobstructed to permit oil to flow between blades above the axis and into the path of blades below the axis, whereby oil is sprayed from said blades in opposite directions from said axis and throughout said housing.

2. In a motion picture machine, a housing, a plurality of parts therein to be lubricated, a rotary member mounted in said housing, radially disposed blades carried by said member and extending laterally therefrom, said blades spaced around the rotary axis of said member, and means for dropping oil into the path of said blades, whereby oil is sprayed from said blades throughout said housing, the structure in said axis being such as to permit oil to flow between blades above the axis and into the path of blades below the axis, whereby oil is sprayed in opposite directions from said axis.

3. In a motion picture machine, a housing, a plurality of parts therein to be lubricated, a rotary member mounted in said housing, separate blades attached to said member and extending laterally therefrom in opposite directions, and means for dropping oil into the path of said blades, whereby oil is sprayed from said blades throughout said housing.

4. In a motion picture machine, a housing, a plurality of parts therein to be lubricated, a rotary shaft therein, a supporting member carried by said shaft in a plane perpendicular thereto, means carried laterally by said member for throwing oil in substantially opposite directions from the axis of said shaft, and means for delivering oil to the first means.

5. In a motion picture machine, a housing, a plurality of parts therein to be lubricated, a rotary shaft therein, a supporting member carried by said shaft in a plane perpendicular thereto, means carried by said member and within the circular periphery thereof for throwing oil in substantially opposite directions from the axis of said shaft, and means for delivering oil to the first means.

6. In a motion picture machine, a housing, a plurality of parts therein to be lubricated, a rotary shaft therein, a supporting member carried by said shaft in a plane perpendicular thereto, means carried laterally by said member and within the circular periphery thereof for throwing oil in substantially opposite directions from the axis of said shaft, and means for delivering oil to the first means.

KARL BRENKERT.